US012683858B2

(12) United States Patent
Molleti

(10) Patent No.: US 12,683,858 B2
(45) Date of Patent: Jul. 14, 2026

(54) OPEN INTERFACE PREDICTIVE AND RESPONSIVE ADAPTOR SYSTEM AND METHOD

(71) Applicant: RAKUTEN SYMPHONY, INC., Tokyo (JP)

(72) Inventor: Kranthi Molleti, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 255 days.

(21) Appl. No.: 18/040,806

(22) PCT Filed: Nov. 21, 2022

(86) PCT No.: PCT/US2022/050537
§ 371 (c)(1),
(2) Date: Feb. 6, 2023

(87) PCT Pub. No.: WO2024/112317
PCT Pub. Date: May 30, 2024

(65) Prior Publication Data
US 2024/0314025 A1    Sep. 19, 2024

(51) Int. Cl.
*H04L 67/02* (2022.01)
*H04L 41/06* (2022.01)
*H04L 41/0806* (2022.01)

(52) U.S. Cl.
CPC .......... *H04L 41/0806* (2013.01); *H04L 41/06* (2013.01); *H04L 67/02* (2013.01)

(58) Field of Classification Search
CPC ...... H04L 41/0806; H04L 41/06; H04L 67/02

USPC ......................................................... 709/220
See application file for complete search history.

(56) References Cited

U.S. PATENT DOCUMENTS

| | | | |
|---|---|---|---|
| 2020/0120182 A1* | 4/2020 | Kotecha | H04L 47/70 |
| 2022/0038902 A1* | 2/2022 | Mueck | H04W 52/367 |
| 2022/0159525 A1* | 5/2022 | Chou | H04W 36/22 |
| 2022/0210708 A1* | 6/2022 | Parekh | H04W 36/0058 |
| 2023/0052974 A1* | 2/2023 | Thoria | H04L 63/029 |

FOREIGN PATENT DOCUMENTS

WO        2023007452 A1      2/2023

* cited by examiner

*Primary Examiner* — Ario Etienne
*Assistant Examiner* — Kidest Mendaye
(74) *Attorney, Agent, or Firm* — HAUPTMAN HAM, LLP

(57) ABSTRACT

A system includes processing circuitry; and a memory connected to the processing circuitry, wherein the memory is configured to store executable instructions that, in response to being executed by the processing circuitry, facilitate performance of operations to receive, at an open interface predictive and responsive adaptor (OPRA), one or more network device registration requests; send, by the OPRA, one or more configuration requests, based on the one or more network device registration requests, to a fault, configuration, accounting, performance, and security (FCAPS) application; receive, by the OPRA, one or more network device configurations from a configuration application included in the FCAPS application; and register, by the OPRA, the one of more network devices with the FCAPS application, based on the received one of more network device configurations from the configuration application included in the FCAPS application.

20 Claims, 8 Drawing Sheets

OPEN INTERFACE PREDICTIVE AND RESPONSIVE ADAPTOR SYSTEM AND METHOD

RELATED APPLICATIONS

The present application is a National Phase of International Application No. PCT/US2022/050537, filed Nov. 21, 2022.

TECHNICAL FIELD

This description relates to a system for an open interface predictive and responsive adaptor and method of using the same.

BACKGROUND

An open interface is a public standard for connecting hardware to hardware and software to software. Regarding hardware, open interface implies that there is more than one brand of product that is connected to the device with the open interface. In the case of software, open interface implies that more than one program exists to interface with the application that has the open interface or that a program is readily written to communicate with the application that has the open interface.

An adapter, regarding computing, is either a hardware component (e.g., device) or software that allows two or more incompatible devices to be linked together for the purpose of transmitting and receiving data. Given an input, an adapter alters the input to provide a compatible connection between the components of a system. Both software and hardware adapters are configured to be used in many different devices such as mobile phones, personal computers, servers, and telecommunications networks for a wide range of purposes. Some adapters are built into devices, while others are installed on a computer's motherboard or connected as external devices. A software component adapter is a type of software that is logically located between two software components and reconciles the differences between.

SUMMARY

In some embodiments, a system includes processing circuitry; and a memory connected to the processing circuitry, wherein the memory is configured to store executable instructions that, in response to being executed by the processing circuitry, facilitate performance of operations to receive, at an open interface predictive and responsive adaptor (OPRA), one or more network device registration requests; send, by the OPRA, one or more configuration requests, based on the one or more network device registration requests, to a fault, configuration, accounting, performance, and security (FCAPS) application; receive, by the OPRA, one of more network device configurations from a configuration application included in the FCAPS application; and register, by the OPRA, the one of more network devices with the FCAPS application, based on the received one of more network device configurations from the configuration application included in the FCAPS application.

In some embodiments, a method executed by processing circuitry, includes receiving, at an open interface predictive and responsive adaptor (OPRA), one or more network device registration requests; sending, by the OPRA, one or more configuration requests, based on the one or more network device registration requests, to a fault, configuration, accounting, performance, and security (FCAPS) application; receiving, by the OPRA, one of more network device configurations from a configuration application included in the FCAPS application; and registering, by the OPRA, the one of more network devices with the FCAPS application, based on the received one of more network device configurations from the configuration application included in the FCAPS application.

In some embodiments, a non-transitory tangible computer readable storage medium storing a computer program, wherein the computer program contains instructions that in response to being executed, cause processing circuitry to perform operations to receive, at an open interface predictive and responsive adaptor (OPRA), one or more network device registration requests; send, by the OPRA, one or more configuration requests, based on the one or more network device registration requests, to a fault, configuration, accounting, performance, and security (FCAPS) application; receive, by the OPRA, one of more network device configurations from a configuration application included in the FCAPS application; and register, by the OPRA, the one of more network devices with the FCAPS application, based on the received one of more network device configurations from the configuration application included in the FCAPS application.

BRIEF DESCRIPTION OF THE DRAWINGS

Aspects of the present disclosure are best understood from the following embodiments read with the accompanying figures. In accordance with the standard practice in the industry, various features are not drawn to scale. The dimensions of the various features are arbitrarily increased or reduced for clarity of discussion.

DETAILED DESCRIPTION

Figure 1:
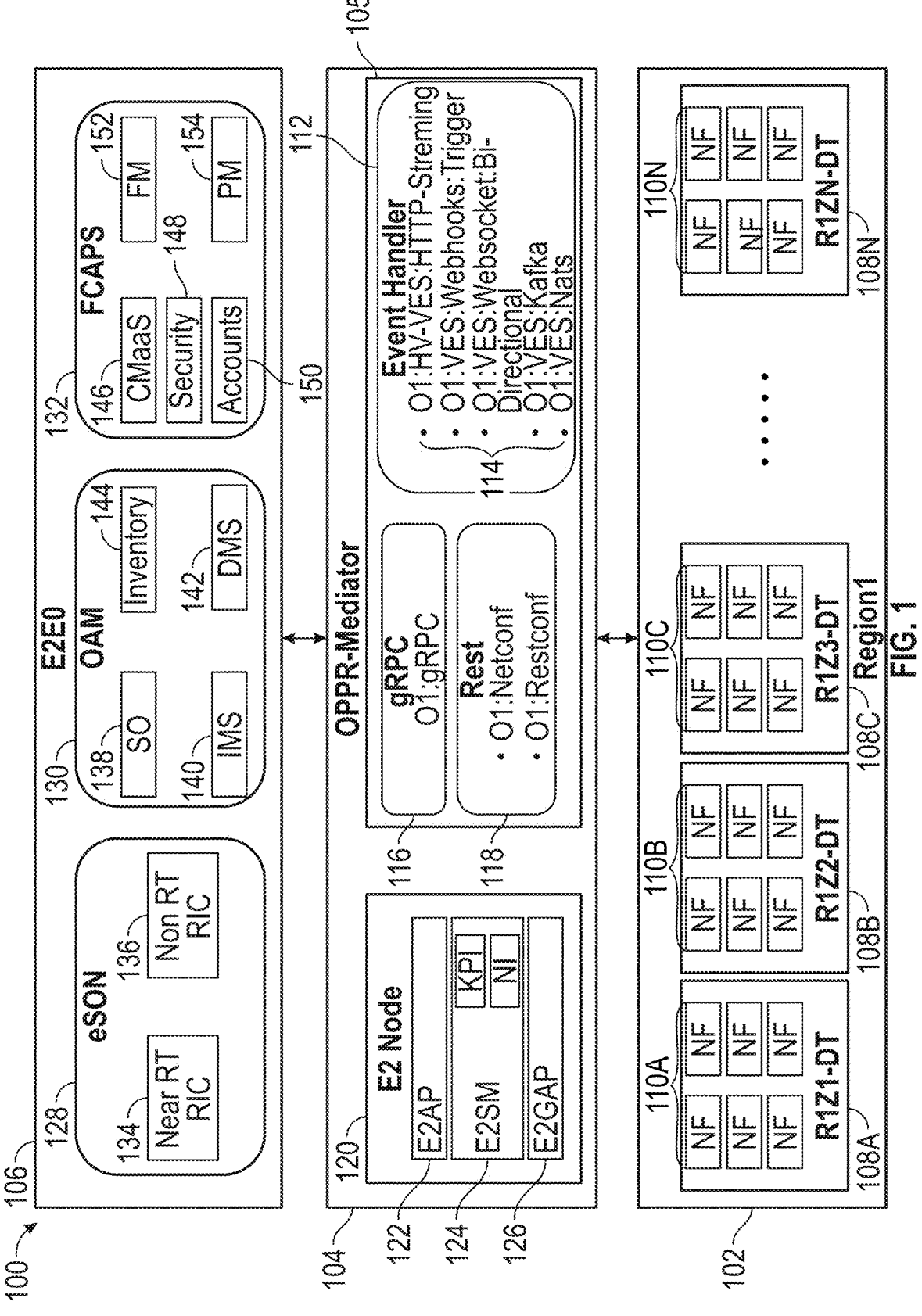
FIG. 1 is a block diagram of an open interface predictive and responsive adaptor (OPRA) system, in accordance with some embodiments.

The following embodiments include many different examples, for implementing different features of the subject matter. Examples of components, values, operations, materials, arrangements, or the like, are described below to simplify the embodiments. These are, of course, examples and unintended to limit. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to contact directly. In addition, the present disclosure repeats reference numerals and/or letters in the various examples. This repetition is for the purpose of simplicity and clarity and any indication of a relationship between the various embodiments and/or configurations discussed is unintended.

Further, spatially relative terms, such as "beneath," "below," "lower," "above," "upper" and the like, are usable herein for ease of description to describe one element or feature's relationship to another element or feature as illustrated in the figures. The spatially relative terms are intended to encompass different orientations of the device in use or operation in addition to the orientation depicted in the figures. One or more apparatus embodiments are otherwise oriented (rotated 90 degrees or at other orientations) and the spatially relative descriptors usable herein likewise are interpreted accordingly.

In some embodiments, an open interface predictive/responsive adaptor/mediator (OPRA) is discussed.

The timing for telecommunication applications request-responses and events varies from a few microseconds, to milliseconds, to seconds.

In computer science, request-response or request-reply is one of the methods computers use to communicate with each other in a network, in which the first computer sends a request for data and the second computer responds to the request. Request-respond is a message exchange pattern in which a requestor sends a request message to a replier system, which receives and processes the request, ultimately returning a message in response. Request-respond is analogous to a telephone call, in which the caller must wait for the recipient to pick up before anything is discussed. This is a messaging pattern which allows two applications to have a two-way conversation with one another over a channel. For simplicity, this pattern is typically implemented in a purely synchronous fashion, as in web service calls over hypertext transfer protocol (HTTP), which holds a connection open and waits until the response is delivered, or a timeout period expires.

An event is a change in state, or an annotated label based on an entity's log output in a system. For example, when a consumer purchases an online product, the product's state changes from "for sale" to "sold". A seller's system architecture treats this state change as an event whose occurrence is made known to other applications within the architecture. What is produced, published, propagated, detected, or consumed is a message called the event notification, and not the event, which is the state change that triggered the message emission. Events occur and event messages are generated and propagated to report the event that occurred. Nevertheless, the term event is often used metonymically to denote the notification event message. Computer event messages are generated or triggered by a system, by a user, or in other ways based upon the event. Event messages are handled synchronously with the program flow; that is, the software is configured to have one or more dedicated places (e.g., a data sink) where event messages are handled. A source of event messages includes the user, who interacts with the software through the computer's peripherals; for example, by typing on a keyboard. Another source is a hardware device such as a timer. Software is configured to further trigger the software's own set of event messages into the event channel (e.g., to communicate the completion of a task). Software that changes behavior in response to event messages is said to be event-driven, often with the goal of being interactive.

In some embodiments, an adaptive mediator supports third-party software that is configured to perform analysis, logging, and metrics of data for self-optimization and self-organization of telecommunications applications.

In communications technology, self-optimization is a process in which the system's settings are autonomously and continuously adapted to the traffic profile and the network environment in terms of topology, propagation, and interference. Together with self-planning and self-healing, self-optimization is one of the pillars of the self-organizing networks (SON) management paradigm. The autonomous trait of self-optimization involves no human intervention during the optimization process.

A SON is an automation technology designed to make the planning, configuration, management, optimization, and healing of mobile radio access networks (RANs) simpler and faster. SON functionality and behavior has been described and specified in mobile industry recommendations produced by organizations such as 3GPP (3rd Generation Partnership Project) and the NGMN (Next Generation Mobile Networks). Newly added base stations are self-configured in line with a plug-and-play paradigm while operational base stations regularly self-optimize parameters and algorithmic behavior in response to observed network performance and radio conditions. Furthermore, self-healing mechanisms are triggered to temporarily compensate for a detected equipment outage, while awaiting a more permanent solution.

In other approaches, EMS (Element Management System), NMS (Network Management System), OAM (Operations, Administration, and Maintenance) & SON are vendor-specific interfaces which transmit and receive data via protocols like SNMP (Simple Network Management Protocol), Netconf (network configuration protocol), and the like, for all FCAPS (fault, configuration, accounting, performance, and security) operation. Combining high latency, medium latency, and low latency time-bounded request-response and event interfaces are a problem in the evolving telecommunications world of complex networks.

An EMS includes systems and applications for managing network elements (NE) on the network element-management layer (NEL) of the telecommunications management network (TMN) model. The EMS's functionality is divided into five areas: fault, configuration, accounting, performance, and security (FCAPS). Portions of each of the FCAPS functionality fit into the TMN models. Northbound (an interface that allows a component to communicate with a higher-level component, using the latter component's southbound interface), the EMS interfaces to network management systems and or service management systems depending on the deployment scenario. Southbound (decomposes concepts in the technical details, mostly specific to a single component of the architecture), the EMS talks to the devices.

In software defined networking (SDN), southbound interfaces are the OpenFlow protocol specification that enables communication between controllers, switches, and other network nodes, which are with lower-level components. This further lets the router identify network topology, determine network flows, and implement requests sent to the router via northbound interfaces. Southbound application programming interfaces (APIs) allow the end-user to gain better control over the network and promotes the efficiency level of a SDN controller to evolve based on real-time demands. In addition, the SDN controller communicates with the forwarding plane to modify the networks that let the SDN controller to progressively move along with the advancing enterprise calls. To compose a more responsive network layer to real-time traffic demands, administrators add or remove entries to the internal flow-table of network switches and routers.

Contradictory to southbound APIs, northbound interfaces allow communication among the higher-level components. While traditional networks use a firewall or load balancer to control data plane behavior, SDN installs applications that use the controller, and these applications communicate with the controller through the northbound interface. The northbound API makes innovation or customization easier for network operators of the network controls and processing as this task doesn't require expertise, as the API is cleaned by a programmer who excels in programming languages. A northbound interface is an (API) or protocol that allows a lower-level network component to communicate with a higher-level or more central component, while a southbound interface allows a higher-level component to send commands to lower-level network components.

EMS manages one or more types of telecommunications network element. Typically, the EMS manages the functions and capabilities within each NE but does not manage the traffic between different NEs in the network. To support management of the traffic between itself and other NEs, the EMS communicates upward to higher-level network management systems (NMS). The EMS provides the foundation to implement TMN-layered operations support system (OSS) architectures that enable service providers to meet customer needs for rapid deployment of new services, as well as meeting stringent quality of service (QOS) requirements.

A NMS is a system that constantly monitors a computer network for slow or failing components and notifies the network administrator (via email, SMS, or other alarms) in case of outages or other trouble. Network monitoring is part of network management.

OAM or operations, administration, and maintenance (OA&M or OAM) are the processes, activities, tools, and standards involved with operating, administering, managing, and maintaining systems. This commonly applies to telecommunication, computer networks, and computer hardware. The OAM features covered by this protocol are discovery, link monitoring, remote fault detection, and remote loopback.

SNMP is an Internet standard protocol for collecting and organizing information about managed devices on IP networks and for modifying that information to change device behavior. Devices that typically support SNMP include cable modems, routers, switches, servers, workstations, printers, and the like. SNMP is widely used in network management for network monitoring. SNMP exposes management data in the form of variables on the managed systems organized in a management information base (MIB) which describe the system status and configuration. These variables then are remotely queried (and, in some circumstances, manipulated) by managing applications.

NETCONF provides mechanisms to install, manipulate, and delete the configuration of network devices. NETCONF operations are realized on top of a simple remote procedure call (RPC) layer. The NETCONF protocol uses an extensible markup language (XML) based data encoding for the configuration data as well as the protocol messages. The protocol messages are exchanged on top of a secure transport protocol. The NETCONF protocol has been implemented in network devices such as routers and switches. One strength of NETCONF is support for robust configuration change using transactions involving several devices.

Other approaches do not provide for representational state transfer (REST) based open interfaces with different time bounds for network functions (NFs) to third-party software. REST is a software architectural style that describes a uniform interface between physically separate components, often across the Internet in a client-server architecture. REST describes four interface constraints: (1) identification of resources, (2) manipulation of resources, (3) self-descriptive messages, and (4) hypermedia as the engine of application state. REST describes a machine-to-machine interface. In web development REST allows content to be rendered when the content is requested, often referred to as dynamic content. REST dynamic content uses server-side rendering to generate a web site and send the content to the requesting web browser, which interprets the server's code and renders the page in the user's web browser. REST is accepted for creating stateless, reliable web APIs. A web API that obeys the REST constraints is informally described as RESTful. In general, RESTful web APIs are loosely based on HTTP methods such as GET and POST. HTTP requests are used to access data or resources in the web application via URL-encoded parameters. Responses are generally formatted as either JSON or XML to transmit the data.

Other approaches do not provide for an elastic logger for acquisition of low, medium, and high-volume data in the range of bytes to gigabytes for telecommunication applications. Elastic logging is a service that scales, automatically ingesting data of any source, size, and format without the need for further configuration by the end user. Elastic logging reacts and delivers results in real-time, keeping up with constant changes such as containerized microservices.

Other approaches do not provide for a common adaptor for dynamic configuration and static configuration of network applications based on the state.

In some embodiments, a mediator interface isolates, parses, and streams data from NFs to OAM and eSON modules. In some embodiments, the mediator supports REST based protocols like NETCONF, representational state transfer configuration protocol (RESTCONF), and binary stream protocols, such as g remote procedure calls (gRPC), and event handlers shall support WebSocket, advanced message queuing protocol (AMQP), Webhooks, HTTP streaming, and the like.

HTTP-based protocol RESTCONF provides a programmatic interface based on standard mechanisms for accessing configuration data, state data, data-model-specific remote procedure call (RPC) operations and events.

gRPC (a recursive acronym) is a cross-platform open-source high performance RPC framework. gRPC uses HTTP/2 for transport, protocol buffers as the interface description language, and provides features such as authentication, bidirectional streaming, and flow control, clienting or nonclienting bindings, and cancellation and timeouts. gRPC generates cross-platform client and server bindings for many languages. Most common usage scenarios include connecting services in a microservices style architecture or connecting mobile device clients to backend services.

WebSocket is a computer communications protocol, providing full-duplex communication channels over a single transmission control protocol (TCP) connection. The WebSocket protocol enables interaction between a web browser (or other client application) and a web server with lower overhead than half-duplex alternatives such as HTTP polling, facilitating real-time data transfer from and to the server. This is made possible by providing a standardized way for the server to send content to the client without being first requested by the client and allowing messages to be passed back and forth while keeping the connection open. In this way, a two-way ongoing conversation takes place between the client and the server.

AMQP is an open standard (a standard that is openly accessible and usable by anyone) application layer protocol for message-oriented middleware. The defining features of AMQP are message orientation, queuing, routing (including point-to-point and publish-and-subscribe), reliability and security. AMQP mandates the behavior of the messaging provider and client to the extent that implementations from different vendors are interoperable, in the same way as simple mail transfer protocol (SMTP), HTTP, file transfer protocol (FTP), and the like have created interoperable systems.

Webhooks are "user-defined HTTP callbacks". Webhooks are usually triggered by some event, such as pushing code to a repository, or a comment being posted to a blog. When that event occurs, the source site makes an HTTP request to the URL configured for the webhook. Users configure the webhooks to cause events on one site to invoke behavior on another. Common uses are to trigger builds with continuous integration systems or to notify bug tracking systems. Because webhooks use HTTP, integration into web services occurs without adding new infrastructure.

HTTP streaming, push technology, or server push is a style of Internet-based communication where the request for a given transaction is initiated by the publisher or central server. HTTP streaming is contrasted with pull/get, where the request for the transmission of information is initiated by the receiver or client. Push services are often based on information preferences expressed in advance. HTTP streaming is called a publish/subscribe model. A client "subscribes" to various information "channels" provided by a server; whenever new content is available on one of those channels, the server pushes that information out to the client.

In some embodiments, REST based open interfaces for applications are available to connect to northbound interfaces for management and southbound interfaces for dynamic configuration. In some embodiments, an adaptor collects data based on the state of an application to NMS, EMS, and AI tools for self-optimization and self-organization. In some embodiments, an application-state-configuration adaptor provides configuration based on the state of an application. In a non-limiting example, in response to a telecommunications application being in an operational state, a high accuracy and dynamic configuration is provided and in response to an onboarding/initiating state, a static configuration is provided.

In some embodiments, the mediator facilitates openness and inter-operability between vendors which prevents vendor lock in (a situation in which a customer using a product or service is unable to easily transition to a competitor's product or service, usually the result of proprietary technologies that are incompatible with those of competitors) for EMS and NMS. In some embodiments, a network operator or engineer opts for any NF (e.g., CU (centralized unit for each gNB that controls multiple DU's), DU (distributed units are software based and contain some functions related to the remote radio head (RRH) contained in the RU) or RU (radio unit)) from any vendor and has compatibility based on open interfaces to operator OAM and eSON modules which are compliant to open standards like 3GPP, O-RAN, telecom infra project (TIPS), and the like.

In some embodiments, network operators and/or system integrators opt for a suitable NF with respect to the NFs SA (standalone) and NSA (non-standalone) deployments and maintain a centralized eSON and OAM module. In some embodiments, network operators have centralized monitoring, operational, and control systems for hybrid (is a composition of a public cloud and a private environment, such as a private cloud or on-premises resources, that remain distinct entities but are bound together, offering the benefits of multiple deployment models), centralized (processing and storage capabilities are located in one location; such as a data center), & distributed clouds (a cloud computing platform assembled from a distributed set of machines in different locations, connected to a single network or hub service) without vendor lock in.

In some embodiments, network operators maintain a centralized policy manager to enforce the policies dynamically. In some embodiments, network operators integrate with external applications like mobility load balancing (MLB), network slicing, anomaly detection, and the like, to optimize and steer a network.

A policy manager is network assurance policy engine which triggers actions towards northbound systems based upon matching the condition defined for events received from southbound systems.

A policy manager determines the degree to which a service/device is allowed to do what the service/device is attempting/requesting (decision) and is then able to enforce the decision (enforcement). Some examples of policies include (1) is the customer allowed to use this service, (2) is there enough capacity to support this new service, (3) what happens to non-SLA (service level agreement) customers when a node approaches congestion, and (4) is the service request/activity a security threat?

In some embodiments, based on the type of application, NF, or devices, the OPRA mediator identities capabilities during initialization. In some embodiments, after initialization of a device, the OPRA mediator connects to respective modules.

FIG. 1 is a block diagram of an open interface predictive and responsive adaptor (OPRA) system (OPRAS) 100, in accordance with some embodiments.

OPRAS 100 includes one or more regions, such as region 1 102, operably communicating back and forth with open interface predictive proactive and reactive (OPPR) mediator (OPPRM) 104. OPPRM 104 is operably communicating back and forth with end-to-end orchestration (E2EO).

A region, such as region 102, otherwise referred to as zones, lands, or territories, are areas that are broadly divided by physical characteristics (physical geography), human impact characteristics (human geography), and the interaction of humanity and the environment (environmental geography). Geographic regions and sub-regions are mostly described by their imprecisely defined, and sometimes transitory boundaries.

In some embodiments, region 102 is a data center. A data center is a building, a dedicated space within a building, or a group of buildings configured to be used to house computer systems and associated components, such as telecommunications and storage systems. Since information technologies (IT) operations are useful for business continuity, IT generally includes redundant or backup components and infrastructure for power supply, data communication connections, environmental controls (e.g., air conditioning, fire suppression), and various security devices. A large data center is an industrial-scale operation using as much electricity as a small town.

Region 102 is broken up into zones, such as RIZ1 108A which is region 1 zone1. The remainder of the zones are RIZ2 108B, RIZ3 108C through to RIZN 108N, where N is a positive integer. Each zone includes a data terminal (DT). In some embodiments, DT is a NE, such as a server, a CU, a DU, and an RU depending on the size and structure of the region. In the context of telecommunications, a terminal is a device which ends a telecommunications link and is the point at which a signal enters or leaves a network.

Within each DT are one or more network functions (NFs) 110A, 110B, 110C through 110N. A NF is a functional building client within a network infrastructure, which has well-described external interfaces and a well-described functional behavior. In practical terms, a NF is often a network node, a mobile device, or physical appliance.

In some embodiments, OPPRM 104 isolates, parses, and streams data from NFs, such as NFs 110A, 110B, 110C through 110N, to OAM 130 and eSON 128 modules. In some embodiments, OPRA 105 supports REST based protocols like NETCONF (REST adaptor 118), representational state transfer configuration protocol (RESTCONF) (REST adaptor 118), and binary stream protocols, such as g remote procedure calls (gRPC) (gRPC adaptor 116), and event handlers, such as event handler 112 support WebSocket, advanced message queuing protocol (AMQP), Webhooks, HTTP streaming, and the like included in event channels 114.

OPRA 105 includes an event handler 112. In some embodiments, an event handler includes an event driven architectural (EDA) pattern applied by the design and implementation of applications and systems that transmit event messages among loosely coupled software components and services. An event-driven system typically consists of event emitters (agents, data sources), such as NFs 110A, 110B, 110C through 110N, event consumers (sinks) such as eSON 128 and OAM 130, and event channels (the medium the event messages travel from emitter to consumer), such as event channels 114. Event emitters detect, gather, and transfer event messages. An event emitter is unable to know the consumers of the event messages, the event emitter is unable to even know whether an event consumer exists, and in the event the consumer exists, the event emitter is unable to know how the event message is used or further processed. Event consumers apply a reaction as soon as an event message is presented. The reaction is or is not completely provided by the event consumer. For example, the event consumer filters the event message frame while the event policy executes and produces transformation and forwards the event message frame to another component or the event consumer supplies a self-contained reaction to such event message frame. Event channels, such as event channels 114, are conduits in which event message frames are transmitted from event emitters to event consumers. In some embodiments, event consumers become event emitters after receiving event message frames and then forwarding the event message frames to other event consumers. The configuration of the correct distribution of event message frames is present within the event channel. The physical implementation of event channels is based on components, such as message-oriented middleware or point-to-point communication, which might rely on a more appropriate transactional executive framework (such as a configuration file that establishes the event channel).

OPRA 105 further includes request-response handlers gRPC adaptor 116 and REST adaptor 118. REST and gRPC adaptors are discussed in detail above. REST based open interfaces, such as REST adaptor 118 connect to North bound interfaces for Management and South bound interfaces for dynamic configuration of NEs and/or NFs.

OPPRM 104 further includes E2 node 120. An E2 interface is an open interface between two end points, e.g., near-RT (real time) RIC (RAN intelligent controller) 134 and E2 nodes, such as E2 node 120, e.g., DUs, CUs in 5G and O-RAN compliant eNBs in 4G. E2 protocol allows near-RT RIC 134 to control procedures and functionalities of the E2 nodes, such as E2 node 120.

E-UTRAN Node B, also known as Evolved Node B (abbreviated as eNodeB or eNB), is the element in E-UTRA of long-term evolution (LTE) that is the evolution of the element Node B in UTRA of UMTS. ENB is the hardware that is connected to the mobile phone network that communicates directly wirelessly with mobile handsets (UEs), like a base transceiver station (BTS) in GSM networks. Traditionally, a Node B has minimum functionality, and is controlled by a Radio Network Controller (RNC). However, with an eNB, there is no separate controller element. This simplifies the architecture and allows lower response times.

E2 node 120 further enables a collection of metrics from the RAN to near-RT RIC 134, either periodically or after pre-defined trigger events. Both control and data collection procedures connect to one or more cells, slices, QOS (quality of service) classes, or specific UEs (user equipment). E2 interface supports two protocols i.e., E2 Application Protocol (E2AP 120) and E2 Service Model (E2SM 124). E2 service model is used for three applications Key Performance Indicators (KPI), Network Interfaces (NIs) and RAN Control (RC). E2AP 120 is developed in accordance with the general principles stated in the E2GAP 126 (general aspects and principles). In some embodiments, E2 node 120 provides support for analysis, logging and metrics of data for self-optimization and self-organization of telco applications (e.g., eSON 128 and FCAPS 132).

E2EO 106 automates provisioning, monitoring, and operations of a whole 5G network slice consisting of the core network (CN) domain, the transport network (TN) domain, and other domains on common infrastructure. E2EO 106 includes eSON 128, OAM 130, and FCAPS 132.

ESON, discussed above in detail, includes near-RT RIC 134 and non-RT RIC 136. Non-RT RIC 136 is an orchestration and automation function for non-real-time intelligent management of RAN functions. The goal of non-RT RIC 136 is to support non-real-time radio resource management, higher layer procedure optimization, policy optimization in RAN, and providing guidance, parameters, policies, and AI/ML models to support the operation of near-RT RIC functions in the RAN to achieve higher-level non-real-time objectives. Non-RT RIC functions include service and policy management, RAN analytics and model-training for the near-RT RICs, such as near-RT RIC 134. Near-RT RIC 134 resides within a telecommunications edge cloud or regional cloud and is responsible for intelligent edge control of RAN nodes and resources. Near-RT RIC 134 controls RAN elements and their resources with optimization actions that typically take 10 milliseconds to one second to complete. Near-RT RIC 134 receives policy guidance from the non-RT RIC 136 and provides policy feedback to the non-RT RIC 136 through applications called xApps.

XApps are composite applications which combine Web services and data from multiple systems. The application architecture is defined by the SAP Composite Application Framework within the SAP NetWeaver platform. The framework includes the methodology, tools, and run-time environment to develop composite applications. XApps provides a consistent object model and allows developers to build composite applications with a rich user interface, which accesses multiple other heterogeneous applications via services.

OAM 130 includes sharing operator (SO) 138, IP multimedia subsystem (IMS) 140, dynamic monitoring service (DMS) 142, and inventory 144. SOs are service providers who share, alongside other SOs, the network (RAN/Core network) facilities provided by the Master Operator according to 3GPP TS 36.300 hereby incorporated by reference in entirety. IMS 140 is a standards-based architectural framework for delivering multimedia communications services such as voice, video, and text messaging over IP networks. The IMS specifications were originally created by the 3rd Generation Partnership Project (3GPP) to standardize the implementation of next-generation mobile networks. DMS 142 is a library that enables application and system developers to use a variety of DMS sensors to measure and export customized performance metrics for specific software components.

FCAPS 132 includes cloud management as a service (CMaaS) 146, security management (SM) 148, accounts management (AM) 150, fault management (FM) 152, and performance management (PM) 154. Security management 148 concentrates on limiting and controlling access to digital assets located within the network. To protect the network from hackers, unauthorized users, and physical or electronic sabotage at the security management level. Accounting management 150 or the allocation level is devoted to distributing resources optimally and fairly among network subscribers. This makes effective use of the systems available, minimizing the cost of operation. The function of accounting management 150 in FCAPS 132 is to help administrators configure users and groups based on permissions granted within the system. Access is also restricted to ensure authorized users are allowed to make significant changes to critical network systems. In FCAPS 132 organizations find and correct network problems at FM 152. FM 152 includes the ability to detect, isolate, log, and fix potential faults. By reviewing historical fault data, network administrators further identify patterns and trends to enhance proactive measures that help significantly improve network stability. PM 154 manages the overall performance of the network. PM 154 maximizes the throughput, avoids network bottlenecks and identifies potential problems. A part of this process is to determine which improvements yield the most significant overall performance enhancement. PM tools allow network administrators to monitor performance and troubleshoot issues in real time, while remaining accessible and easy to use. Performance data is also regularly used to identify patterns and trends to make predictions.

Figure 2:
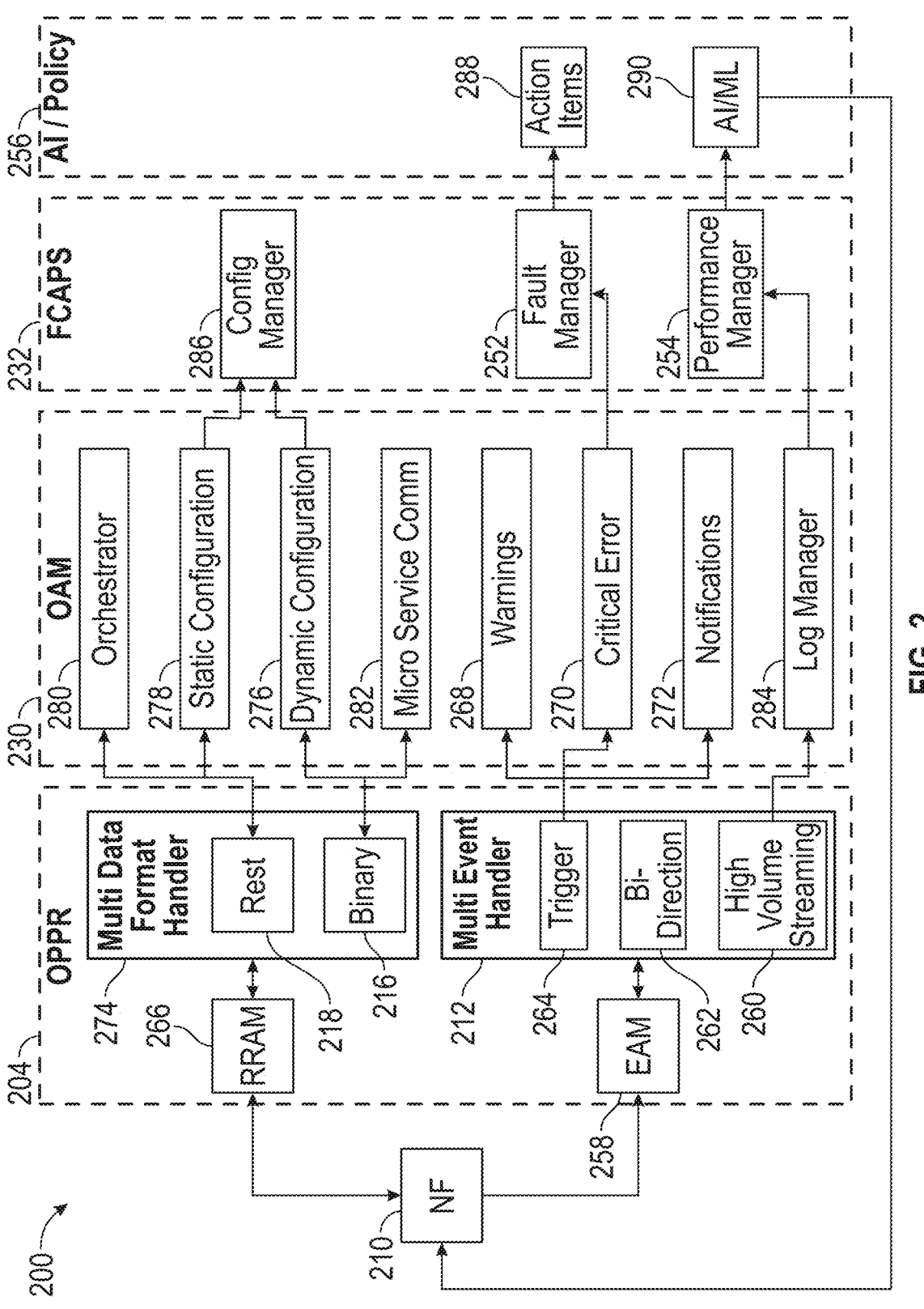
FIG. 2 is a block diagram of an OPRA system, in accordance with some embodiments.

FIG. 2 is a block diagram of an OPRA system (OPRAS) 200, in accordance with some embodiments.

In some embodiments, OPRAS 200 is similar to OPRAS 100. OPRAS 200 includes NF 210, OPPR 204, OAM 230, FCAPS 232, and artificial intelligence (AI)/policy 256. In some embodiments, NF 210 is similar to NFs 110A, 110B, 110C through 110N. In some embodiments, OPPR 204 is similar to OPPR 104. In some embodiments, OAM 230 is similar to OAM 130. In some embodiments, FCAPS 232 is similar to FCAPS 132.

During operation of NF 210, events are streamed to event API module (EAM) 258. EAM 258 provides communication between NF 210 and event handler 212. In some embodiments, event handler 212 is similar to event handler 112. Event handler 212 processes high volume streaming at client 260. In computer science, a stream is a sequence of data elements made available over time. A stream is thought of as items on a conveyor belt being processed one at a time rather than in large batches. Streams are processed differently from batch data-normal functions are unable to operate on streams, as they have potentially unlimited data, and formally, streams are co-data (potentially unlimited), not data (which is finite).

In some embodiments, high volume steaming client 260 is an elastic logger that automatically ingests data of any source, size and format for acquisition of low, medium and high-volume data in the range of bytes to Gigabits for telecommunications applications. In some embodiments, high volume steaming client 260 collects data which is based on the state of application to NMS, EMS and AI tools for self-optimization and self-organization.

Bi-directional streaming is processed at client 262. Bidirectional streaming is where both bi-directional client 262 and EAM 258 send a sequence of messages using a read-write stream. The two streams operate independently, so clients and servers read and write in whatever order. The order of messages in each stream is preserved.

In some embodiments, a policy manager included with event handler 212 that includes trigger 264 which matches a network assurance policy with an event based on the output of an evaluator that identifies the root causes of the received events. Trigger 264 then forwards the matched policy/event to warnings client 268, critical error client 270, and/or notifications client 272 such as to begin an action workflow at action items 288. In some embodiments, the action items 288 includes ticket alert that creates an incident creation or trigger 264 to begin a workflow action. In some embodiments, the action items 288 include trigger workflow. In some embodiments, the trigger workflow performs actions based on a user-created network assurance policy. In some embodiments, the trigger workflow initiates the sending of a notification at client 272. In some embodiments, the trigger workflow initiates a reboot, restart, scale in, scale out, or other suitable actions within the embodiments.

During operation of NF 210, request-responses are communicated back and forth between NF 210 and request-response API module (RRAM) 266. RRAM 266 further communicates request responses with multi-data format handler 274. Data handlers are protocol-neutral and transform data from one format to another. Data handlers typically transform native data (such as XML, CSV, and COBOL) to a business object and a business object to native data.

Multi-data format handler 274 includes REST adaptor 218, which is similar to REST adaptor 118, and binary adaptor 216, which is similar to gRPC adaptor 116. Binary adaptor 216 communicates with dynamic configuration bock 276. Dynamic configuration client 276 and static configuration client 278 (in communication with binary adaptor 216 and REST adaptor 218 respectively) are adaptors for dynamic configuration 276 and static configuration 278 of network applications, such as NF 210, based on the state of the network applications. In some embodiments, REST based open interfaces, such as REST adaptor 218, for applications, such as NF 210, are available to connect to northbound interfaces for management and southbound interfaces for static configuration. In some embodiments, an application-state-configuration adaptor, such as REST adaptor 218 and binary adaptor 216, provides configuration based on the state of an application, such as NF 210. In a non-limiting example, in response to a telecommunications application being in an operational state, high accuracy and dynamic configuration 276 is provided and in response to an onboarding/initiating a state, a static configuration 278 is provided.

REST adaptor 218 further communicates with orchestrator 280. In some embodiments, orchestrator 280 has a service-oriented architecture, virtualization, provisioning, converged infrastructure, and dynamic data center. In some embodiments, Orchestrator 280 aligns business requests with applications, data, and infrastructure. In the context of cloud computing, orchestration includes a workflow and provides a directed action towards larger goals and objectives. In this context, and with the overall aim to achieve specific goals and objectives (described through the QoS parameters), for example, meet application performance goals using minimized cost and maximize application performance within budget constraints, cloud management solutions further encompass frameworks for workflow mapping and management.

Binary adaptor 216 communicates with microservices communications 282. In some embodiments, binary adaptor 216 provides connecting services in a microservices style architecture, such as xAPPs, or connecting mobile device clients to backend services. A microservices architecture is a strategy for building applications. Microservices divide what normally is a monolithic application into a suite of independent, loosely integrated services called microservices. These microservices work together to create a pluggable application architecture. The individual services communicate with each other via language and platform agnostic APIs. The APIs are usually exposed as REST endpoints, WebHooks, or lightweight messaging protocols. Compared to traditional, monolithic applications, microservices applications are more agile and flexible. By keeping the connections between the individual microservices loose and pluggable, developers achieve an application architecture that facilitates development, upgrades, and maintenance.

High volume streaming client 260 is in communication with log manager 284. In some embodiments, log manager 284 In some embodiments, log manager 284 deals with large volumes of computer-generated log messages (further known as audit records, audit trails, event-logs, and the like). In some embodiments, log manager 284 provides log collection, centralized log aggregation, c=long-term log storage and retention, log rotation, log analysis (in real-time and in bulk after storage), and log search and reporting. In some embodiments, log manager 284 reacts and delivers results in real-time, keeping up with constant changes such as containerized microservices.

Log manager 284 is in communication with performance manager 254. In some embodiments, performance manager is similar to performance manager 154. Critical error client 270 is in communication with fault manager 252. In some embodiments, fault manager is similar to fault manager 152. Static and dynamic configuration clients 278 and 276 are in communication with configuration manager 286. Configuration manager 286 tracks and manages deployments and related upkeep in a centralized manner. Configuration manager 286 establishes the foundation for other network management functions. Configuration manager 286 centralizes the storage of configurations, sets the stage for future expansion, streamlines device configurations and provisioning, and seamlessly tracks changes. Configuration manager 286 monitors and controls network operation including hardware and programming changes including the addition of new equipment and programs, modification of existing systems and removal of obsolete systems and programs. In some embodiments, configuration manager 186 maintains an inventory of equipment and programs and updates regularly.

Fault manager 252 is in communication with action items 288. An action is triggered based upon a matched policy. In some embodiments, processing circuitry such as processing circuitry 502 of FIG. 5, logically evaluates and processes collected events. In some embodiments, the processing circuitry identifies root causes, decides relevant actions pursuant to predetermined policies and instructs action items 288 according to the predetermined network assurance policies. In some embodiments, the action items 288 collect the results of event processing and takes a respective action related to the collected result. In a non-limiting example, action items 288 send an email, send a request to an API endpoint, and other suitable actions within the embodiments. In some embodiments, action items 288 obtain job status feedback to determine the status of the executed job and update a backend application at the database, so that users determine a status of the job through a UI, such as UI 518 of FIG. 5.

Performance manager 254 is in communication with AI/ML (machine learning) engine 290. In some embodiments, AI/ML engine 290 provides tools for self-optimization and self-organization as discussed above. AI is intelligence demonstrated by machines. AI refers to a system that perceives the environment and takes actions that maximize chances of achieving goals. ML is understanding and building methods that learn, that is, methods that leverage data to improve performance on some set of tasks. ML algorithms build a model based on sample data, known as training data, to make predictions or decisions without being explicitly programmed. AI/ML engine 290 feeds back self-optimization and self-organization instructions to NF 210.

Figure 3A:
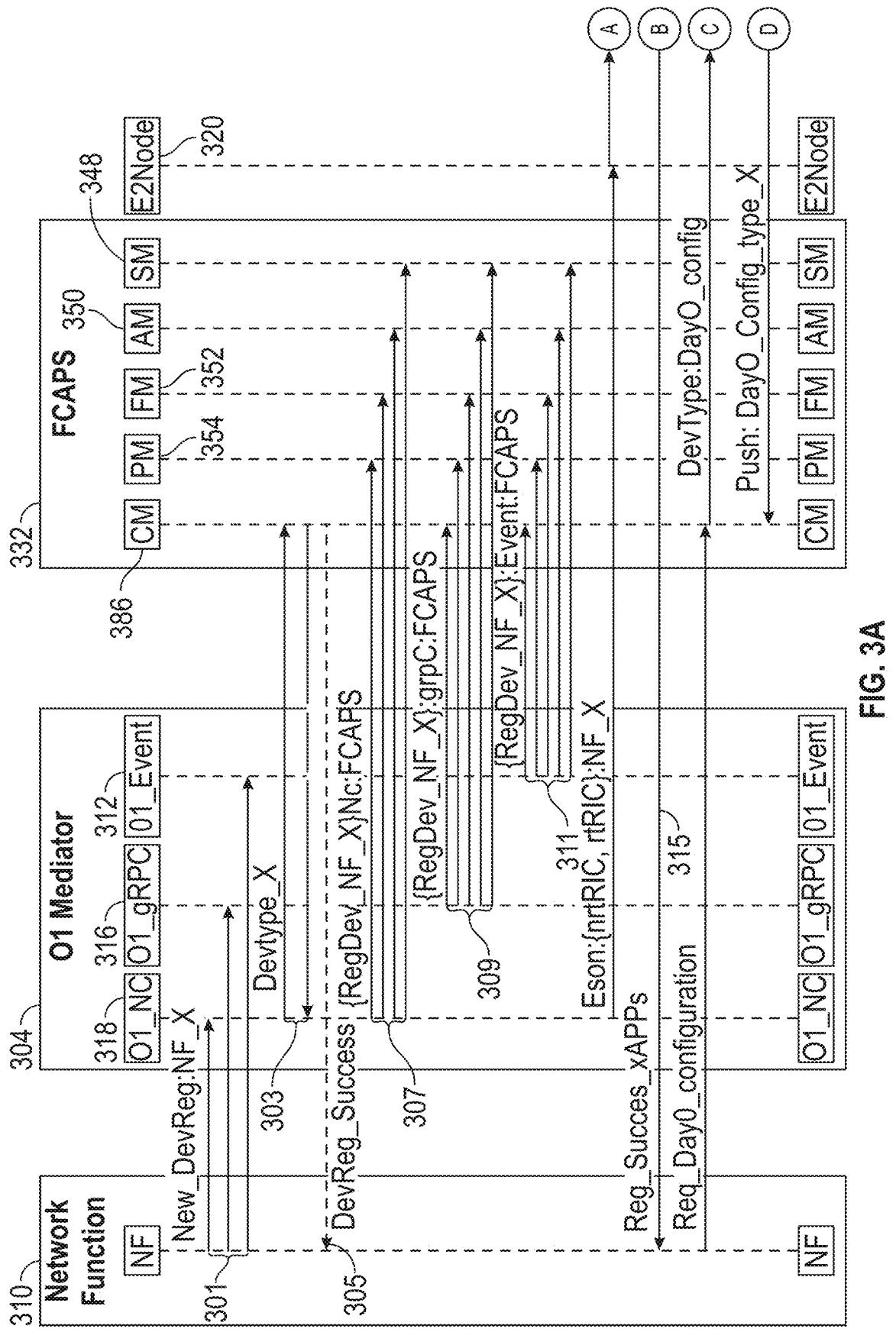
FIGS. 3A and 3B are data flow diagrams for a method of registration call flow, in accordance with some embodiments.
Figure 3B:
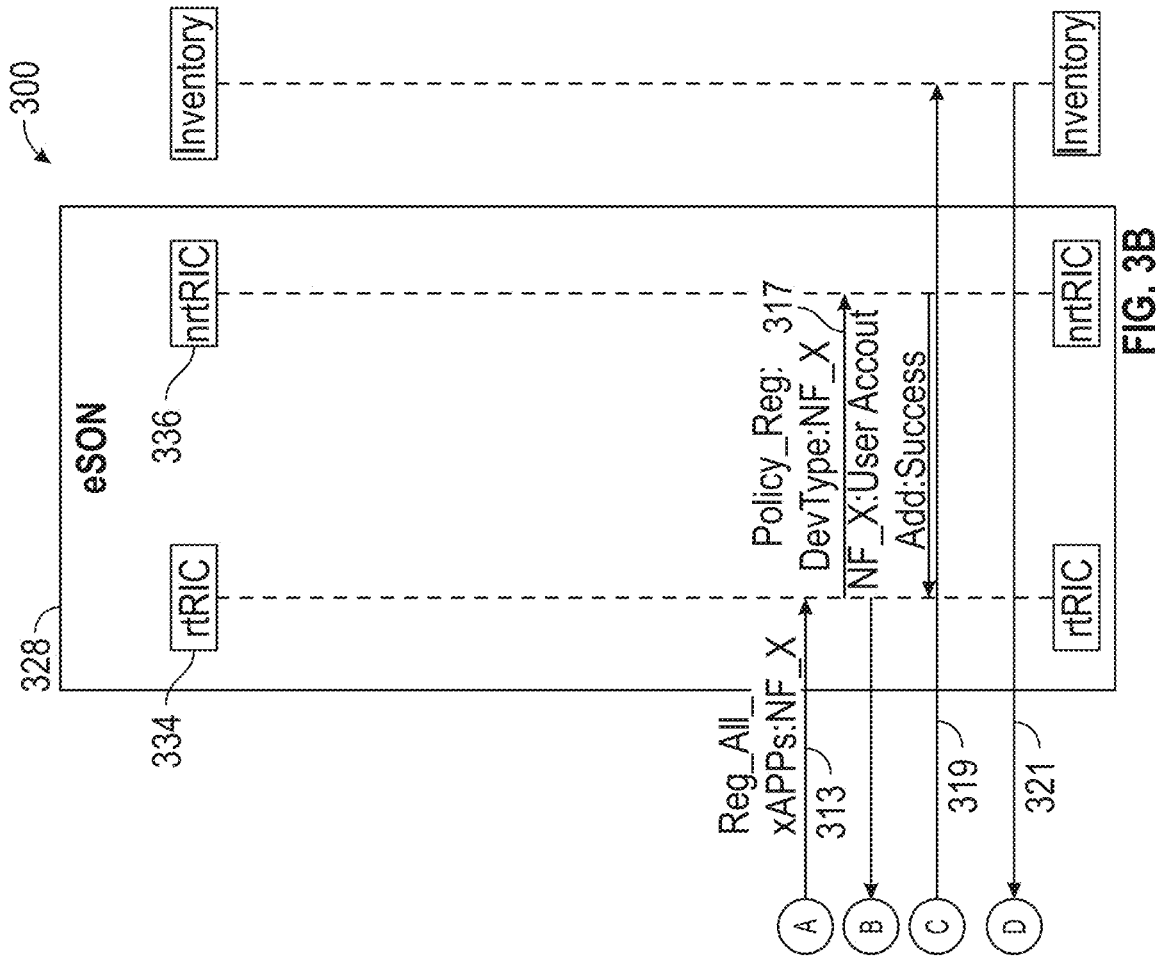

FIGS. 3A and 3B are data flow diagrams for a method of registration call flow 300, in accordance with some embodiments.

FIGS. 3A and 3B are discussed to provide an understanding of the operation of OPRAS 200 and 100 through method of registration call flow 300. In some embodiments, method of registration call flow 300 is a functional overview of a OPRAS 200 and 100. In some embodiments, method of registration call flow 300 is executed by processing circuitry 502 discussed below with respect to FIG. 5. In some embodiments, some, or all the operations of method of registration call flow 300 are executed in accordance with instructions corresponding to instructions 506 discussed below with respect to FIG. 5.

Method of registration call flow 300 includes operations 301-321, but the operations are not necessarily performed in the order shown. Operations are added, replaced, order changed, and/or eliminated as appropriate, in accordance with the spirit and scope of the embodiments. In some embodiments, one or more of the operations of method of registration call flow 300 are repeated. In some embodiments, unless specifically stated otherwise, the operations of method of registration call flow 300 are performed in order.

At operation 301 of method of registration call flow 300, a new NE, including one or more NFs, such as NF 310, is registered with Netconf client 318, gRPC client 316, and event handler 312 (or NMS or EMS client) of OPRA 304. In some embodiments, a user scans the bar code pasted on each NE, such as one or more servers, using a bar code scanner for the registration process. In some embodiments, in response to the user confirming that scanning of the one or more NEs has been completed, an OPRA application is opened (e.g., in a mobile device UE) and the user enters data center related information (e.g., the region information) in a form within the OPRA application and then marks the data center construction complete.

In some embodiments, the new NE is similar to the DTs of FIG. 1. In some embodiments, the NF 310 is similar to NF 210 and 110. In some embodiments, Netconf client 318 is similar to the Netconf client included in REST adaptor 118. In some embodiments, gRPC client 316 is similar to the gRPC client included in gRPC adaptor 116. In some embodiments, event handler 312 is similar to event handlers 212 and 112. Process flows from operation 301 to operation 303.

At operation 303 of method of registration call flow 300, Netconf client 318 sends new device/functions information to CM client 386 which updates CM client 386 in FCAPS module 332. In some embodiments, CM client 386 is similar to config manager 286. In some embodiments, FCAPS module 332 is similar to FCAPS module 232 and 132. Process flows from operation 303 to operation 305.

At operation 305 of method of registration call flow 300, NF 310 receives an acknowledgement from CM client 386 of device/functions registration success. Process flows from operation 305 to operation 307.

At operation 307 of method of registration call flow 300, in response to the device/functions registration and hand-shake being complete, the new device and functions, such as NF 310, are registered with PM client 354, FM client 352, AM client 350, and SM client 348 with Netconf client 318. In some embodiments, PM client 354 is similar to perfor-mance manager 254 and 154. In some embodiments, FM client 352 is similar to fault manager 252 and 152. In some embodiments, AM client 350 is similar to accounts man-agement 150. In some embodiments, SM client 348 is similar to security management 148. Process flows from operation 307 to operation 309.

At operation 309 of method of registration call flow 300, the new device and functions, such as NF 310, are registered with CM client 386, PM client 354, FM client 352, AM client 350, and SM client 348 with gRPC client 316. Process flows from operation 309 to operation 311.

At operation 311 of method of registration call flow 300, the new device and functions, such as NF 310, are registered with CM client 386, PM client 354, FM client 352, AM client 350, and SM client 348 with event module 312. Process flows from operation 311 to operation 313.

At operation 313 of method of registration call flow 300, xAPPs (e.g., NFs) are registered with eSON module 328 via E2Node 320 at near-RT RIC 334. In some embodiments, eSON module 328 is similar to eSON 128. In some embodi-ments, E2Node 320 is similar to E2 Node 120. In some embodiments, near-RT RIC 334 is similar to near-RT RIC 134. Process flows form operation 313 to operation 315.

At operation 315 of method of registration call flow 300, NF 310 receives acknowledgment from near-RT RIC 334 that the xApps were registered successfully. Process flows form operation 315 to operation 317.

At operation 317 of method of registration call flow 300, new devices/functions are registered to non-RT RIC 336, based on the number of xAPPs registered with respect to each new device. In some embodiments, non-RT RIC 336 is similar to non-RT RIC 136. Process flows from operation 317 to operation 319.

At operation 319 of method of registration call flow 300, in response to the registration process of one or more NEs (and NFs) of the data center being complete, an API call is made to inventory 344 sending the complete NE inventory information to inventory 344. In some embodiments, inven-tory 344 is similar to inventory 144. Process flows from operation 319 to operation 321.

At operation 321 of method of registration call flow 300, inventory 344 sends an acknowledgement response back.

Figure 4A:
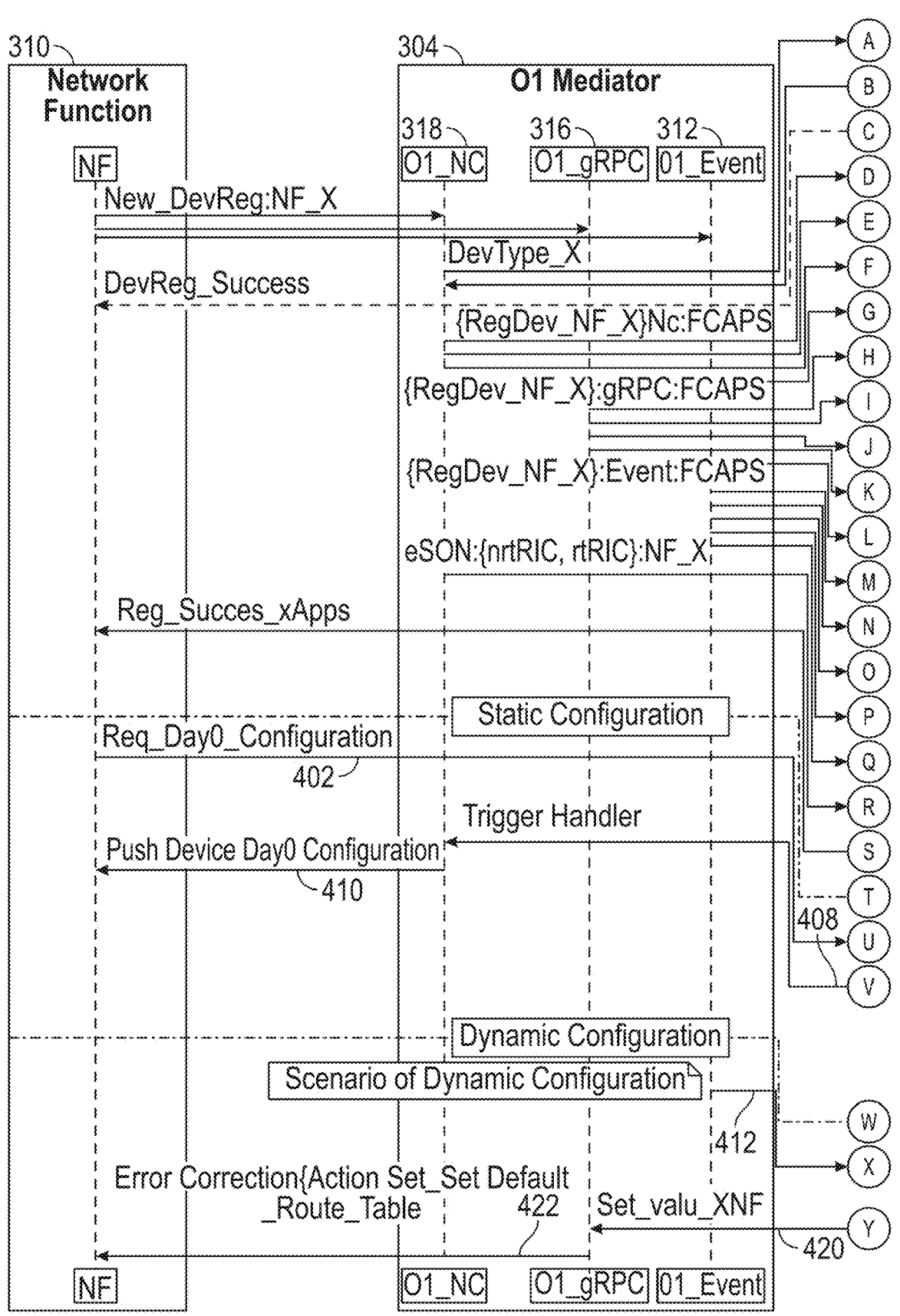
FIGS. 4A, 4B and 4C are data flow diagrams of a method for static and dynamic configuration, in accordance with some embodiments.
Figure 4B:
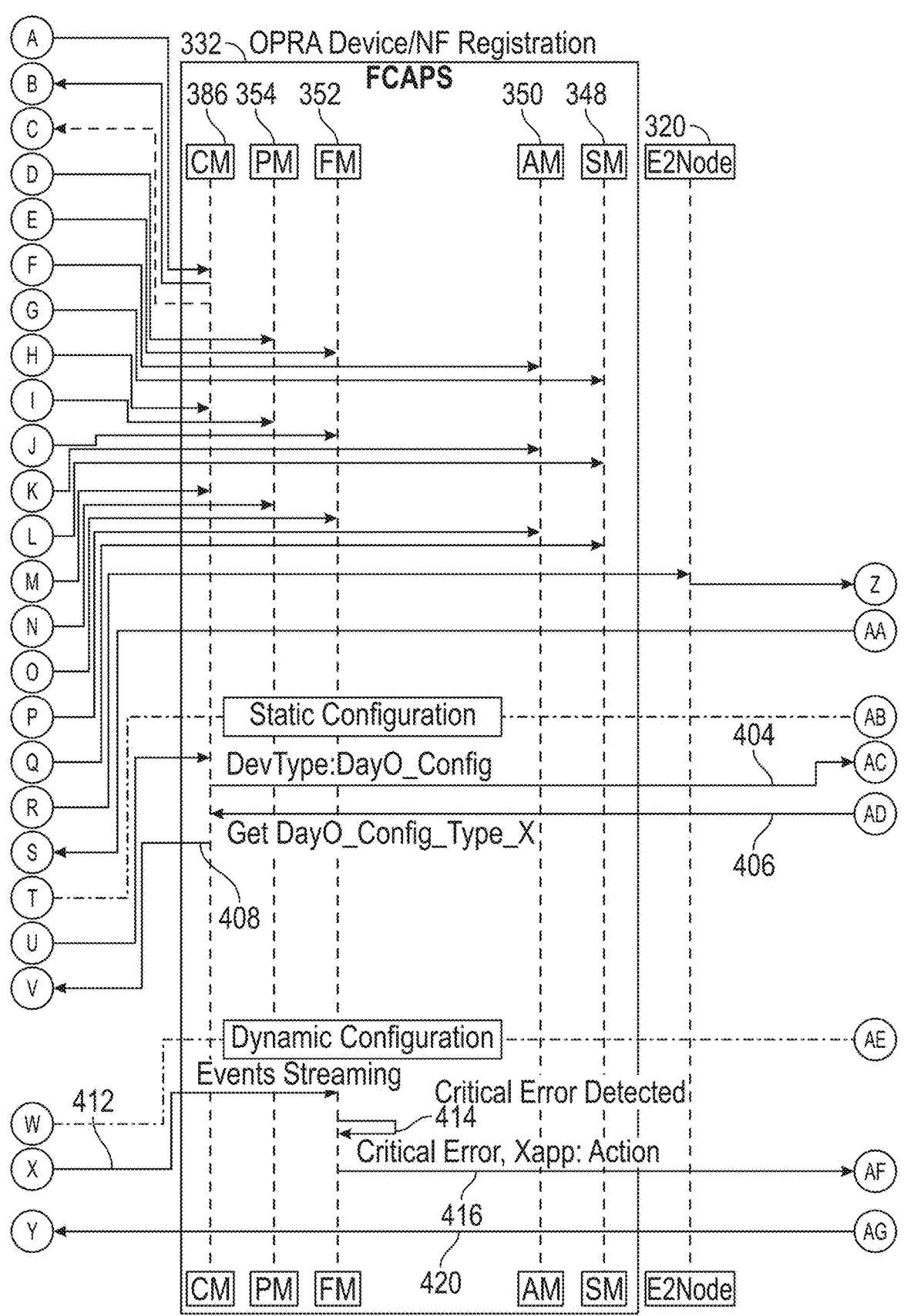
Figure 4C:
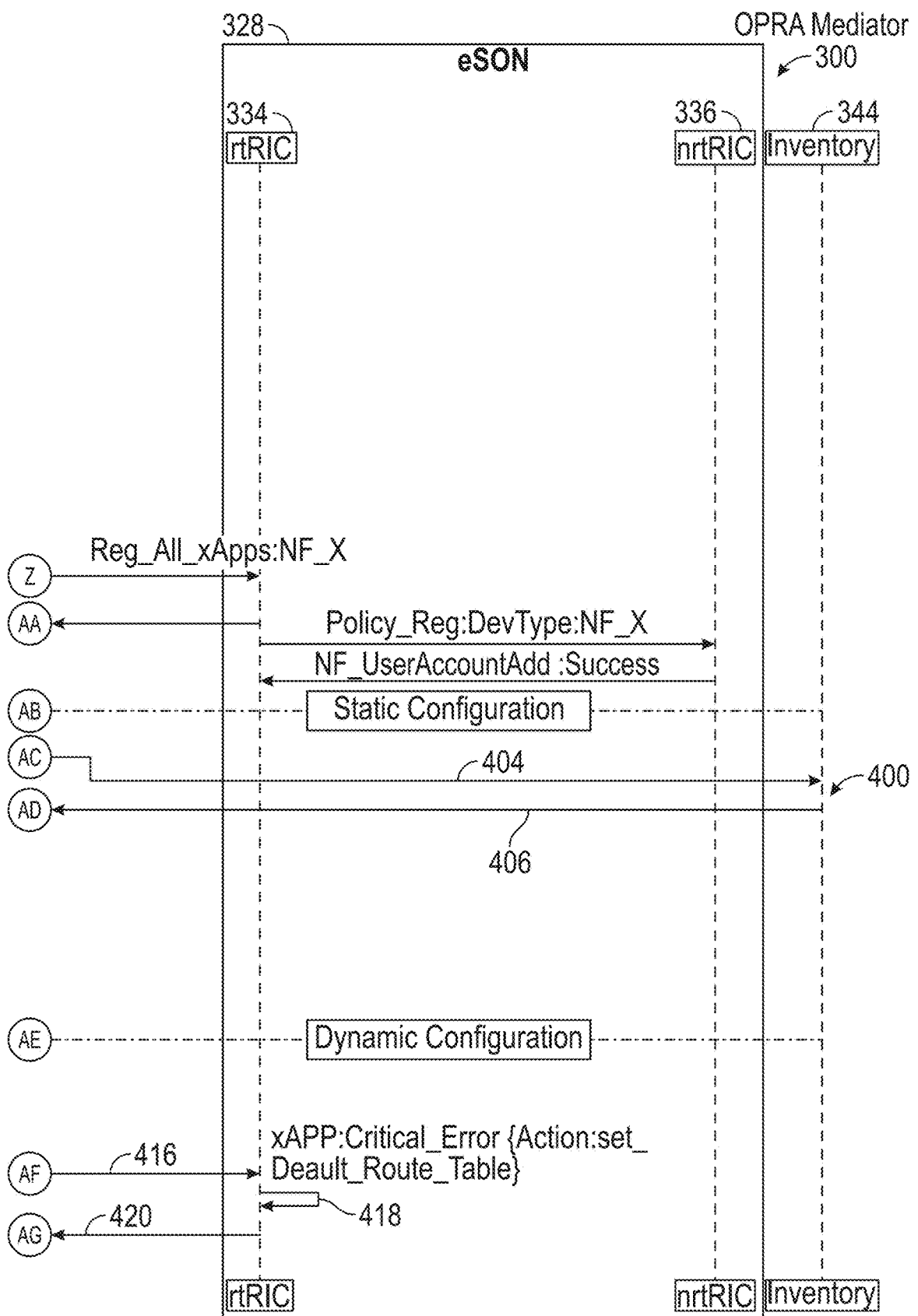

FIGS. 4A, 4B and 4C are data flow diagrams of a method for static and dynamic configuration 400, in accordance with some embodiments.

FIGS. 4A, 4B, and 4C are discussed to provide an understanding of the operation of OPRAS 200 and 100 through method for static and dynamic configuration 400. In some embodiments, method for static and dynamic configu-ration 400 is a functional overview of a OPRAS 200 and 100. In some embodiments, method for static and dynamic configuration 400 is executed by processing circuitry 502 discussed below with respect to FIG. 5. In some embodi-ments, some, or all the operations of method for static and dynamic configuration 400 are executed in accordance with instructions corresponding to instructions 506 discussed below with respect to FIG. 5.

Method for static and dynamic configuration 400 includes operations 402-422, but the operations are not necessarily performed in the order shown. Operations are added, replaced, order changed, and/or eliminated as appropriate, in accordance with the spirit and scope of the embodiments. In some embodiments, one or more of the operations of method for static and dynamic configuration 400 are repeated. In some embodiments, unless specifically stated otherwise, the operations of method for static and dynamic configuration 400 are performed in order.

At operation 402 of method for static and dynamic configuration 400, in response to deployment of new NEs and/or new or updated NFs, a daily configuration request is received at CM 386 of FCAPS 332 from NF 310. A static configuration is used in response to a telecommunications application being onboarded/initiated. Process flows from operation 402 to operation 404.

At operation 404 of method for static and dynamic configuration 400, in response to CM 386 performing the daily configuration for each NE and one or more NFs, CM 386 sends the daily configuration to inventory 344 for storage. Process flows from operation 404 to operation 406.

At operation 406 of method for static and dynamic configuration 400, inventory 344 sends a GET request with the daily configuration type to CM 386. The GET method requests that the target resource transfer a representation of the target's state. GET requests retrieve data and have no other effect. For retrieving resources without making changes, GET is used instead of POST, as GET is addressed through a URL. This enables bookmarking and sharing and makes GET responses eligible for caching, which saves bandwidth. Process flows from operation 406 to operation 408.

At operation 408 of method for static and dynamic configuration 400, a trigger is sent from CM 386 to Netconf client 318. Process flows from operation 408 to operation 410.

At operation 410 of method for static and dynamic configuration 400, a PUSH is sent from Netconf client 318 to NF 310 with the new daily configuration. PUSH technol-ogy or server push is a style of Internet-based communica-tion where the request for a given transaction is initiated by the publisher or central server (e.g., Netconf client 318). PUSH is contrasted with PULL/GET, where the request for the transmission of information is initiated by the receiver or client. Push services are often based on information prefer-ences expressed in advance.

Self-organized networks are configured to use a dynamic configuration for NFs or applications which are in ready state and operational (e.g., the NFs or applications are not being onboarded or initiated, but instead are already up and operating).

At operation 412 of method for static and dynamic configuration 400, events are steamed from event handler 312 to FM 352 (typically indicating a fault or fault condition has occurred). Process flows from operation 412 to opera-tion 414.

At operation 414 of method for static and dynamic configuration 400, FM 352 determines a critical error is detected. In computing, a critical error, fatal exception error, or fatal error is an error that causes a program to abort and therefore return the user to the operating system. In response to this happening, data that the program was processing is lost. A critical error occurs typically in the following cases: an illegal instruction has been attempted, invalid data or code has been accessed, an operation is not allowed in the current ring or CPU mode, a program attempts to divide by zero. Process flows from operation 414 to operation 416.

At operation 416 of method for static and dynamic configuration 400, FM 352, based on the detected critical error, sends an xApp that includes an action to near-RT RIC 334. Process flows from operation 416 to operation 418.

At operation 418 of method for static and dynamic configuration 400, near-RT RIC 334 executes the action xApp. Process flows from operation 418 to operation 420.

At operation 420 of method for static and dynamic configuration 400, RT RIC 334 sends error correction action to gRPC adaptor 316. Process flows from operation 420 to operation 422.

At operation 422 of method for static and dynamic configuration 400, gRPC adaptor 316 communicates an error correction to NF 310.

Figure 5:
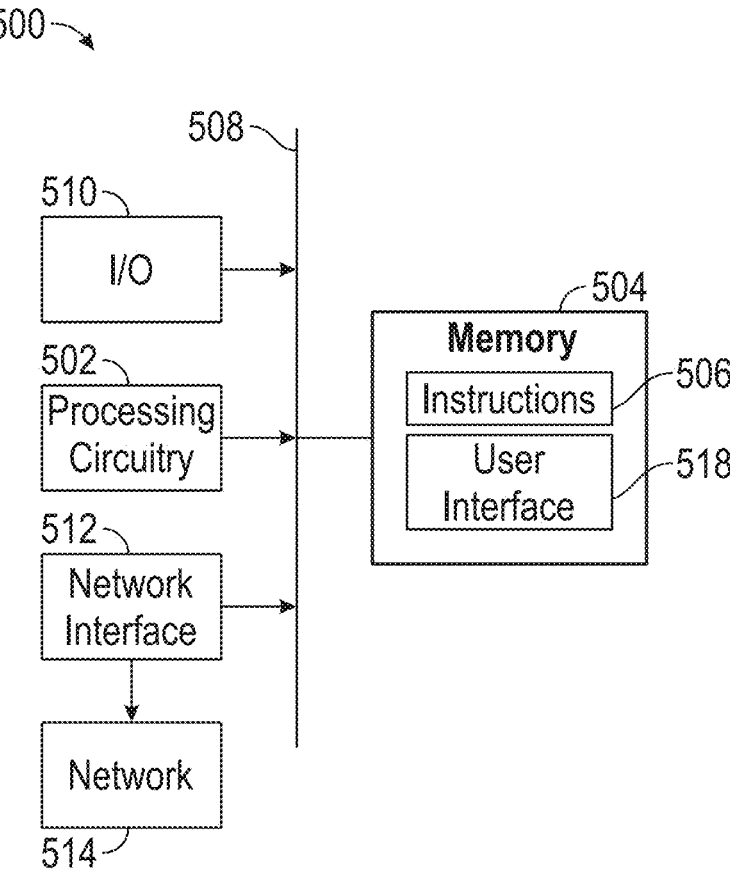
FIG. 5 is a high-level functional block diagram of a processor-based system, in accordance with some embodiments.

FIG. 5 is a block diagram of OPRAS 500 in accordance with some embodiments. In some embodiments, OPRAS 500 is a general-purpose computing device including a hardware processing circuitry 502 and a non-transitory, computer-readable storage medium 504. Storage medium 504, amongst other things, is encoded with, i.e., stores, computer instructions 506, i.e., a set of executable instructions such as an open interface predictive and responsive adaptor mediator. Execution of instructions 506 by hardware processing circuitry 502 represents (at least in part) a OPRA tool which implements a portion or all the methods, such as methods 300 and 400, described herein in accordance with one or more embodiments (hereinafter, the noted processes and/or methods).

Hardware processing circuitry 502 is electrically coupled to a computer-readable storage medium 504 via a bus 508. Hardware processing circuitry 502 is further electrically coupled to an I/O interface 510 by bus 508. A network interface 512 is further electrically connected to processing circuitry 502 via bus 508. Network interface 512 is connected to a network 514, so that processing circuitry 502 and computer-readable storage medium 504 connect to external elements via network 514. Processing circuitry 502 is configured to execute computer instructions 506 encoded in computer-readable storage medium 504 in order to cause OPRAS 500 to be usable for performing the noted processes and/or methods, such as methods 300 and 400 of FIGS. 3A, 3B, 4A, 4B and 4C. In one or more embodiments, processing circuitry 502 is a central processing unit (CPU), a multi-processor, a distributed processing system, an application specific integrated circuit (ASIC), and/or a suitable processing unit.

In one or more embodiments, computer-readable storage medium 504 is an electronic, magnetic, optical, electromagnetic, infrared, and/or a semiconductor system (or apparatus or device). For example, computer-readable storage medium 504 includes a semiconductor or solid-state memory, a magnetic tape, a removable computer diskette, a random-access memory (RAM), a read-memory (ROM), a rigid magnetic disk, and/or an optical disk. In one or more embodiments using optical disks, computer-readable storage medium 504 includes a compact disk-read memory (CD-ROM), a compact disk-read/write (CD-R/W), and/or a digital video disc (DVD).

In one or more embodiments, storage medium 504 stores computer instructions 506 configured to cause OPRAS 500 to be usable for performing a portion or the noted processes and/or methods. In one or more embodiments, storage medium 504 further stores information, such as an open interface predictive response engine which facilitates performing the noted processes and/or methods.

OPRAS 500 includes I/O interface 510. I/O interface 510 is coupled to external circuitry. In one or more embodiments, I/O interface 510 includes a keyboard, keypad, mouse, trackball, trackpad, touchscreen, cursor direction keys and/or other suitable I/O interfaces are within the contemplated scope of the disclosure for communicating information and commands to processing circuitry 502.

OPRAS 500 further includes network interface 512 coupled to processing circuitry 502. Network interface 512 allows OPRAS 500 to communicate with network 514, to which one or more other computer systems are connected. Network interface 512 includes wireless network interfaces such as BLUETOOTH, WIFI, WIMAX, GPRS, or WCDMA; or wired network interfaces such as ETHERNET, USB, or IEEE-864. In one or more embodiments, noted processes and/or methods, are implemented in two or more OPRAS 500.

OPRAS 500 is configured to receive information through I/O interface 510. The information received through I/O interface 510 includes one or more of instructions, data, and/or other parameters for processing by processing circuitry 502. The information is transferred to processing circuitry 502 via bus 508. OPRAS 500 is configured to receive information related to a UI through I/O interface 510. The information is stored in computer-readable medium 504.

In some embodiments, the noted processes and/or methods are implemented as a standalone software application for execution by processing circuitry. In some embodiments, the noted processes and/or methods are implemented as a software application that is a part of an additional software application. In some embodiments, the noted processes and/or methods is implemented as a plug-in to a software application.

In some embodiments, a system includes processing circuitry; and a memory connected to the processing circuitry, wherein the memory is configured to store executable instructions that, in response to being executed by the processing circuitry, facilitate performance of operations to receive, at an open interface predictive and responsive adaptor (OPRA), one or more network device registration requests; send, by the OPRA, one or more configuration requests, based on the one or more network device registration requests, to a fault, configuration, accounting, performance, and security (FCAPS) application; receive, by the OPRA, one of more network device configurations from a configuration application included in the FCAPS application; and register, by the OPRA, the one of more network devices with the FCAPS application, based on the received one of more network device configurations from the configuration application included in the FCAPS application.

In some embodiments, the receiving the one or more network device registration requests includes receive, at a first representational state transfer (REST) based adaptor included in the OPRA, the one or more network device registration requests that include one or more network functions (NFs) for each network device; receive, at a second REST based adaptor included in the OPRA, the one or more network device registration requests that include the one or more NFs for the each network device; and receive, at an event-based adaptor included in the OPRA, the one or more network device registration requests that include the one or more NFs for the each network device.

In some embodiments, the sending the one or more configuration requests to the FCAPS application includes send, from the first REST based adaptor, one or more network device types to the configuration application, wherein a network device type identifies operation of the network device type.

In some embodiments, the registering by the OPRA, the one of more network devices with the FCAPS application includes register, by the first REST based adaptor, the one or more network device registration requests along with the one or more NFs with an application other than the configuration application of the FCAPS application; register, by the second REST based adaptor, the one or more network device registration requests along with the one or more NFs with an application of the FCAPS application; and register, by the event-based adaptor, the one or more network device registration requests along with the one or more NFs with at least one application of the FCAPS application.

In some embodiments, the instructions in response to being executed by the processing circuitry, further facilitate performance of operations to send, by the OPRA, a group of NFs corresponding to each registered network device to a self-organizing network (SON) application that registers the group of NFs with a real time (RT) radio intelligent controller (RIC).

In some embodiments, the instructions in response to being executed by the processing circuitry, further facilitate performance of operations to receive, at the OPRA, a static configuration for one or more network devices operably connected to the OPRA; and push, by the OPRA, the static configuration to the one or more network devices.

In some embodiments, the instructions in response to being executed by the processing circuitry, further facilitate performance of operations to stream, by the OPRA, events to the FCAPS application; and receive, from a SON, an action to be taken based on an fault detection within the events streamed to the FCAPS application.

In some embodiments, the instructions in response to being executed by the processing circuitry, further facilitate performance of operations to send, by the OPRA, an error correction to one or more network functions based on the action received by the OPRA from the SON.

In some embodiments, a method executed by processing circuitry, includes receiving, at an open interface predictive and responsive adaptor (OPRA), one or more network device registration requests; sending, by the OPRA, one or more configuration requests, based on the one or more network device registration requests, to a fault, configuration, accounting, performance, and security (FCAPS) application; receiving, by the OPRA, one of more network device configurations from a configuration application included in the FCAPS application; and registering, by the OPRA, the one of more network devices with the FCAPS application, based on the received one of more network device configurations from the configuration application included in the FCAPS application.

In some embodiments, the receiving the one or more network device registration requests includes receiving, at a first representational state transfer (REST) based adaptor included in the OPRA, the one or more network device registration requests that include one or more network functions (NFs) for each network device; receiving, at a second REST based adaptor included in the OPRA, the one or more network device registration requests that include the one or more NFs for the each network device; and receiving, at an event-based adaptor included in the OPRA, the one or more network device registration requests that include the one or more NFs for the each network device.

In some embodiments, the sending the one or more configuration requests to the FCAPS application includes sending, from the first REST based adaptor, one or more network device types to the configuration application, wherein a network device type identifies operation of the network device type.

In some embodiments, the registering by the OPRA, the one of more network devices with the FCAPS application includes registering, by the first REST based adaptor, the one or more network device registration requests along with the one or more NFs with an application other than the configuration application of the FCAPS application; registering, by the second REST based adaptor, the one or more network device registration requests along with the one or more NFs with an application of the FCAPS application; and registering, by the event-based adaptor, the one or more network device registration requests along with the one or more NFs with at least one application of the FCAPS application.

In some embodiments, the method further includes sending, by the OPRA, a group of NFs corresponding to each registered network device to a self-organizing network (SON) application that registers the group of NFs with a real time (RT) radio intelligent controller (RIC).

In some embodiments, the method further includes receiving, at the OPRA, a static configuration for one or more network devices operably connected to the OPRA; and pushing, by the OPRA, the static configuration to the one or more network devices.

In some embodiments, the method of further includes streaming, by the OPRA, events to the FCAPS application; and receiving, from a SON, an action to be taken based on an fault detection within the events streamed to the FCAPS application.

In some embodiments, the method further includes sending, by the OPRA, an error correction to one or more network functions based on the action received by the OPRA from the SON.

In some embodiments, a non-transitory tangible computer readable storage medium storing a computer program, wherein the computer program contains instructions that in response to being executed, cause processing circuitry to perform operations to receive, at an open interface predictive and responsive adaptor (OPRA), one or more network device registration requests; send, by the OPRA, one or more configuration requests, based on the one or more network device registration requests, to a fault, configuration, accounting, performance, and security (FCAPS) application; receive, by the OPRA, one of more network device configurations from a configuration application included in the FCAPS application; and register, by the OPRA, the one of more network devices with the FCAPS application, based on the received one of more network device configurations from the configuration application included in the FCAPS application.

In some embodiments, the receiving the one or more network device registration requests includes receive, at a first representational state transfer (REST) based adaptor included in the OPRA, the one or more network device registration requests that include one or more network functions (NFs) for each network device; receive, at a second REST based adaptor included in the OPRA, the one or more network device registration requests that include the one or more NFs for the each network device; and receive, at an event-based adaptor included in the OPRA, the one or more network device registration requests that include the one or more NFs for the each network device.

In some embodiments, the sending the one or more configuration requests to the FCAPS application includes send, from the first REST based adaptor, one or more network device types to the configuration application, wherein a network device type identifies operation of the network device type.

In some embodiments, the registering by the OPRA, the one of more network devices with the FCAPS application includes register, by the first REST based adaptor, the one or more network device registration requests along with the one or more NFs with an application other than the configuration application of the FCAPS application; register, by the second REST based adaptor, the one or more network device registration requests along with the one or more NFs with an application of the FCAPS application; and register, by the event-based adaptor, the one or more network device registration requests along with the one or more NFs with at least one application of the FCAPS application.

The foregoing outlines features of several embodiments so that those skilled in the art better understand the embodiments. Those skilled in the art appreciate that ready use of the present disclosure as a basis for designing or modifying other processes and structures for carrying out the same purposes and/or achieving the same advantages of the embodiments introduced herein. Those skilled in the art further realize that such equivalent constructions do not depart from the spirit and scope of the embodiments, and that various changes, substitutions, and alterations do not depart from the spirit and scope of the embodiments.

What is claimed is:

1. A system, comprising:
    processing circuitry; and
    a memory connected to the processing circuitry, wherein the memory is configured to store executable instructions that, in response to being executed by the processing circuitry, facilitate performance of operations to:
        receive, at an open interface predictive and responsive adaptor (OPRA) comprising an event handler that supports WebSocket, advanced message queuing protocol (AMQP), Webhooks, and HTTP streaming protocols for event-driven communication, a gRPC adaptor for binary stream protocols, and a REST adaptor that supports NETCONF and RESTCONF protocols, one or more network device registration requests, wherein each of the one or more network device registration requests relates to a corresponding network device, and a position of the corresponding network device is fixed within a geographic region;
        send, by the OPRA, one or more configuration requests, based on the one or more network device registration requests, to a fault, configuration, accounting, performance, and security (FCAPS) application;
        receive, by the OPRA, one or more network device configurations from a configuration application included in the FCAPS application; and
        register, by the OPRA, the one or more network devices with the FCAPS application, based on the received one or more network device configurations from the configuration application included in the FCAPS application,
    wherein the OPRA provides configuration to the one or more network devices based on a state of the one or more network devices, such that in response to a network device being in an operational state, the OPRA provides dynamic configuration via the gRPC adaptor, and in response to the network device being in an onboarding state, the OPRA provides static configuration via the REST adaptor.

2. The system of claim 1, wherein the receiving the one or more network device registration requests comprises:
    receive, at a first representational state transfer (REST) based adaptor included in the OPRA, the one or more network device registration requests that include one or more network functions (NFs) for each network device;
    receive, at a second REST based adaptor included in the OPRA, the one or more network device registration requests that include the one or more NFs for the each network device; and
    receive, at an event-based adaptor included in the OPRA, the one or more network device registration requests that include the one or more NFs for the each network device.

3. The system of claim 2, wherein the sending the one or more configuration requests to the FCAPS application comprises:
    send, from the first REST based adaptor, one or more network device types to the configuration application, wherein a network device type identifies operation of the network device type.

4. The system of claim 3, wherein the registering by the OPRA, the one or more network devices with the FCAPS application comprises:
    register, by the first REST based adaptor, the one or more network device registration requests along with the one or more NFs with an application other than the configuration application of the FCAPS application;
    register, by the second REST based adaptor, the one or more network device registration requests along with the one or more NFs with an application of the FCAPS application; and
    register, by the event-based adaptor, the one or more network device registration requests along with the one or more NFs with at least one application of the FCAPS application.

5. The system of claim 4, wherein the instructions in response to being executed by the processing circuitry, further facilitate performance of operations to:
    send, by the OPRA, a group of NFs corresponding to each registered network device to a self-organizing network (SON) application that registers the group of NFs with a real time (RT) radio intelligent controller (RIC).

6. The system of claim 1, wherein the instructions in response to being executed by the processing circuitry, further facilitate performance of operations to:
    receive, at the OPRA, a static configuration for one or more network devices operably connected to the OPRA; and
    push, by the OPRA, the static configuration to the one or more network devices.

7. The system of claim 1, wherein the instructions in response to being executed by the processing circuitry, further facilitate performance of operations to:
    stream, by the OPRA, events to the FCAPS application; and receive, from a SON, an action to be taken based on a fault detection within the events streamed to the FCAPS application.

8. The system of claim 7, wherein the instructions in response to being executed by the processing circuitry, further facilitate performance of operations to:

send, by the OPRA, an error correction to one or more network functions based on the action received by the OPRA from the SON.

9. A method executed by processing circuitry, comprising:

receiving, at an open interface predictive and responsive adaptor (OPRA) comprising an event handler that supports WebSocket, advanced message queuing protocol (AMQP), Webhooks, and HTTP streaming protocols for event-driven communication, a gRPC adaptor for binary stream protocols, and a REST adaptor that supports NETCONF and RESTCONF protocols, one or more network device registration requests;

sending, by the OPRA, one or more configuration requests, based on the one or more network device registration requests, to a fault, configuration, accounting, performance, and security (FCAPS) application, wherein each of the one or more network device registration requests relates to a corresponding network device, and a position of the corresponding network device is fixed within a geographic region;

receiving, by the OPRA, one or more network device configurations from a configuration application included in the FCAPS application; and registering, by the OPRA, the one or more network devices with the FCAPS application, based on the received one or more network device configurations from the configuration application included in the FCAPS application, wherein the OPRA provides configuration to the one or more network devices based on a state of the one or more network devices, such that in response to a network device being in an operational state, the OPRA provides dynamic configuration via the gRPC adaptor, and in response to the network device being in an onboarding state, the OPRA provides static configuration via the REST adaptor.

10. The method of claim 9, wherein the receiving the one or more network device registration requests comprises:

receiving, at a first representational state transfer (REST) based adaptor included in the OPRA, the one or more network device registration requests that include one or more network functions (NFs) for each network device;

receiving, at a second REST based adaptor included in the OPRA, the one or more network device registration requests that include the one or more NFs for the each network device; and receiving, at an event-based adaptor included in the OPRA, the one or more network device registration requests that include the one or more NFs for the each network device.

11. The method of claim 10, wherein the sending the one or more configuration requests to the FCAPS application comprises:

sending, from the first REST based adaptor, one or more network device types to the configuration application, wherein a network device type identifies operation of the network device type.

12. The method of claim 11, wherein the registering by the OPRA, the one or more network devices with the FCAPS application comprises:

registering, by the first REST based adaptor, the one or more network device registration requests along with the one or more NFs with an application other than the configuration application of the FCAPS application;

registering, by the second REST based adaptor, the one or more network device registration requests along with the one or more NFs with an application of the FCAPS application; and registering, by the event-based adaptor, the one or more network device registration requests along with the one or more NFs with at least one application of the FCAPS application.

13. The method of claim 12, further comprising:

sending, by the OPRA, a group of NFs corresponding to each registered network device to a self-organizing network (SON) application that registers the group of NFs with a real time (RT) radio intelligent controller (RIC).

14. The method of claim 9, further comprising:

receiving, at the OPRA, a static configuration for one or more network devices operably connected to the OPRA; and pushing, by the OPRA, the static configuration to the one or more network devices.

15. The method of claim 9, further comprising:

streaming, by the OPRA, events to the FCAPS application; and receiving, from a SON, an action to be taken based on a fault detection within the events streamed to the FCAPS application.

16. The method of claim 15, further comprising:

sending, by the OPRA, an error correction to one or more network functions based on the action received by the OPRA from the SON.

17. A non-transitory tangible computer readable storage medium storing a computer program, wherein the computer program contains instructions that in response to being executed, cause processing circuitry to perform operations to:

receive, at an open interface predictive and responsive adaptor (OPRA) comprising an event handler that supports WebSocket, advanced message queuing protocol (AMQP), Webhooks, and HTTP streaming protocols for event-driven communication, a gRPC adaptor for binary stream protocols, and a REST adaptor that supports NETCONF and RESTCONF protocols, one or more network device registration requests, wherein each of the one or more network device registration requests relates to a corresponding network device, and a position of the corresponding network device is fixed within a geographic region;

send, by the OPRA, one or more configuration requests, based on the one or more network device registration requests, to a fault, configuration, accounting, performance, and security (FCAPS) application;

receive, by the OPRA, one or more network device configurations from a configuration application included in the FCAPS application; and register, by the OPRA, the one or more network devices with the FCAPS application, based on the received one or more network device configurations from the configuration application included in the FCAPS application, wherein the OPRA provides configuration to the one or more network devices based on a state of the one or more network devices, such that in response to a network device being in an operational state, the OPRA provides dynamic configuration via the gRPC adaptor, and in response to the network device being in an onboarding state, the OPRA provides static configuration via the REST adaptor.

18. The non-transitory tangible computer readable storage medium of claim 17, wherein the receiving the one or more network device registration requests comprises:

receive, at a first representational state transfer (REST) based adaptor included in the OPRA, the one or more network device registration requests that include one or more network functions (NFs) for each network device;

receive, at a second REST based adaptor included in the OPRA, the one or more network device registration requests that include the one or more NFs for the each network device; and receive, at an event-based adaptor included in the OPRA, the one or more network device registration requests that include the one or more NFs for the each network device.

19. The non-transitory tangible computer readable storage medium of claim 18, wherein the sending the one or more configuration requests to the FCAPS application comprises:

send, from the first REST based adaptor, one or more network device types to the configuration application, wherein a network device type identifies operation of the network device type.

20. The non-transitory tangible computer readable storage medium of claim 19, wherein the registering by the OPRA, the one or more network devices with the FCAPS application comprises:

register, by the first REST based adaptor, the one or more network device registration requests along with the one or more NFs with an application other than the configuration application of the FCAPS application;

register, by the second REST based adaptor, the one or more network device registration requests along with the one or more NFs with an application of the FCAPS application; and register, by the event-based adaptor, the one or more network device registration requests along with the one or more NFs with at least one application of the FCAPS application.

\* \* \* \* \*